United States Patent Office 2,982,763
Patented May 2, 1961

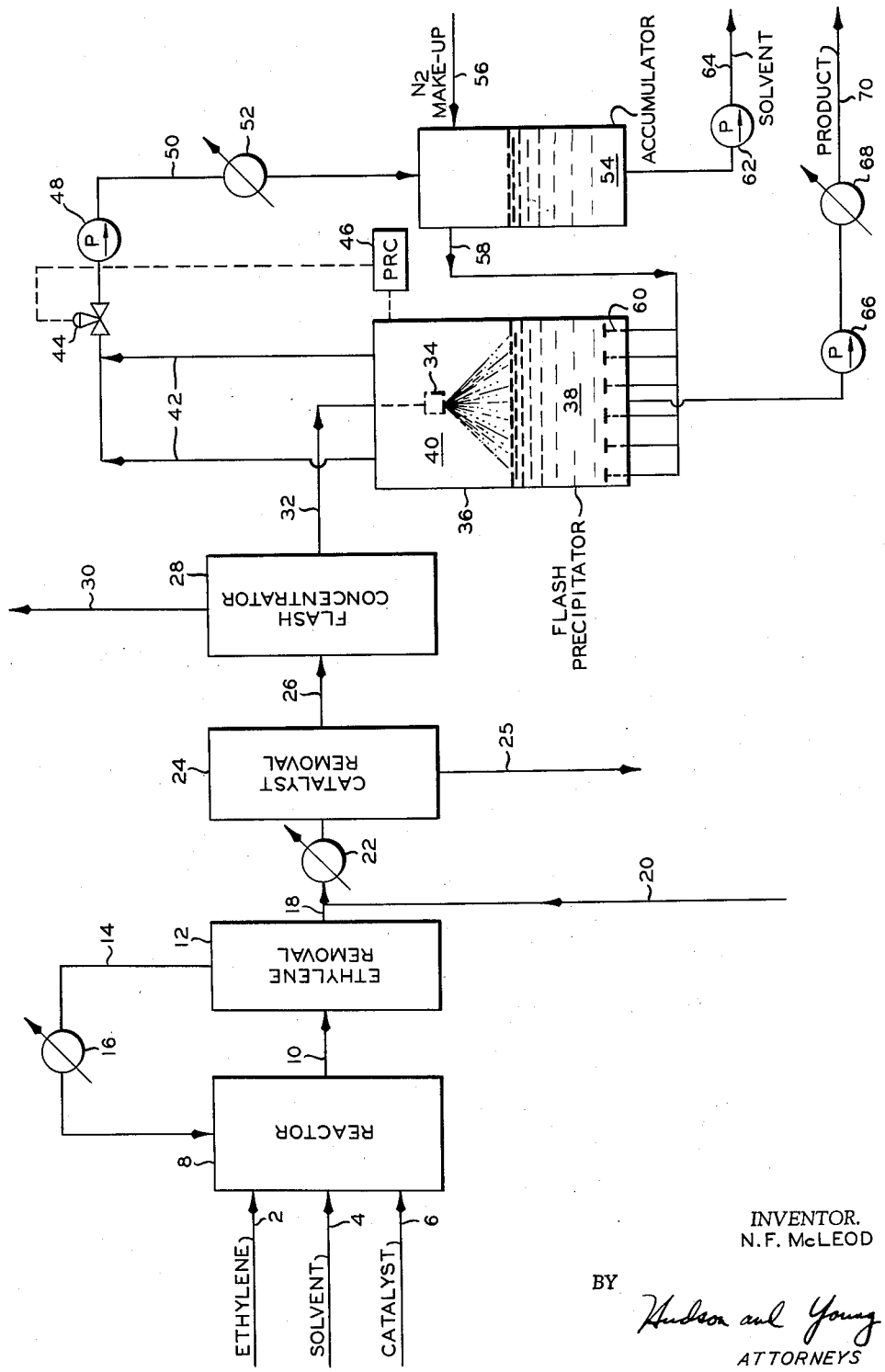

2,982,763

OLEFIN POLYMER RECOVERY PROCESS

Norman F. McLeod, Bartlesville, Okla., assignor to Phillips Petroleum Company, a corporation of Delaware Filed June 10, 1957, Ser. No. 664,768

13 Claims. (Cl. 260—94.9)

This invention relates to a process for the recovery of solid olefin polymers from solution. In one aspect it relates to a continuous autorefrigeration process for precipitating solid olefin polymers from solution in the presence of an inert gas.

Solid olefin polymers treated in the method of this invention are prepared by a method which usually results in a product which is dissolved in a diluent or solvent material. Inasmuch as the polymers are usable primarily in a solvent free condition it becomes necessary to precipitate or otherwise remove the solid polymer from solution. Various methods have been proposed for this purpose, however, difficulties have arisen in that certain characteristics of the polymer products appear to be affected by the particular preparation process employed. Thus, the polymer is frequently obtained in a physical state, e.g. stringy or fibrous, which hinders recovery of the polymer from solution by filtration, centrifugation or other conventional means. In general it is desirable to obtain a homogeneous polymer product, that is, a product having a substantially uniform product size or range of size so that separation of the precipitated material from the solvent is readily effected and so that quality control of the finish polymer product can be established.

It is an object of this invention to provide an improved process for the recovery of solid polymers of olefins from solution.

Another object of this invention is to provide an improved process for the precipitation of solid olefin polymers from solution.

Still another object of this invention is to provide an improved method for controlling the particle size of solid olefin polymers precipitated from solution.

Yet another object of this invention is to provide an improved method for recovering a homogeneous product of solid olefin polymers from solution.

These and other objects of the invention will become more readily apparent from the following detailed description and discussion.

The foregoing objects are achieved broadly by introducing a solution of solid olefin polymer under an elevated temperature and pressure to a zone of lower pressure in contact with an inert gas whereby solvent is vaporized, the solution is reduced in temperature and solid polymer precipitates therefrom, and thereafter further cooling the polymer solution to precipitate additional olefin polymer.

In one aspect of the invention the additional cooling is provided by indirect heat exchange.

In another aspect of the invention the additional cooling is provided by introducing cold solid to the polymer solution.

In still another aspect of the invention the additional cooling is provided by further reducing the pressure on the polymer solution.

In yet another aspect of the invention the additional cooling is provided by further reducing the pressure on the polymer solution in the presence of an inert gas.

The polymers which are treated within the scope of this invention include a wide variety of olefin polymers, such as, for example polymers or copolymers of monoolefins like ethylene, propylene, butylene, etc., also copolymers of mono-olefins and diolefins such as butadiene, isoprene, etc. The invention is particularly applicable to polymers of 1-olefins having a maximum of 8 carbon atoms per molecule and no branching nearer the double bond than the 4-position and more particularly to polymers of ethylene which have a specific gravity of at least 0.94 at 20° C. and preferably 0.96 or higher and a crystallinity of at least 70 percent and preferably at least 80 percent at ordinary atmospheric temperatures.

A preferred polymerization method is described in detail in a copending application of Hogan and Banks, Serial No. 573,877, filed March 26, 1956, now Patent No. 2,825,721. This particular method utilizes a chromium oxide catalyst, preferably containing hexavalent chromium with silica, alumina, silica-alumina, zirconia, thoria, etc. In one embodiment of this application, olefins are polymerized in the presence of a hydrocarbon diluent, for example an acyclic, alicyclic or, less preferably, aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either transinternal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly transinternal unsaturation. Polymers prepared by both methods are also characterized by their high densities and high percentage of crystallinity at normal atmospheric temperatures.

Other less advantageous procedures which employ different catalysts are also used for preparing olefin polymers. For example, polymers are prepared in the presence of organometallic compounds such as triethylaluminum plus titanium tetrachloride, mixtures of ethyl aluminum halides with titanium tetrachloride, and the like. Another group of catalysts which is used comprises a halide of a group IV metal such as, for example, titanium tetrachloride, silicon tetrabromide, zirconium tetrachloride, tin tetrabromide, etc., with one or more free metals selected from the group consisting of sodium, potassium, lithium, rubidium, zinc, cadmium and aluminum.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is usually maintained at a sufficient level to assure a liquid phase reaction, that is at least about 100 to 300 p.s.i.g., depending upon the type of feed material and the polymerization temperature. Higher pressures up to 500 to 700 p.s.i.g. or higher can be used, if desired. If it is desired to carry out the process in the vapor state much lower pressures, down to atmospheric, can be employed. When utilizing a fixed bed the space velocity varies from as low as about 0.1 to about 20 volumes of feed per volume of catalyst, with the preferred range being between about 1 and about 6 volumes per volume per hour. When operating with a mobile catalyst it is desirable to maintain the catalyst concentration in the reaction zone between about 0.01 and about 10 percent by weight. Residence time can be from 10 minutes or less to 10 hours or more.

The use of a diluent in the polymerization reaction in general serves two purposes. Since the reactions are usually exothermic in nature, the presence of a quantity of diluent provides a method for obtaining close control of the reaction temperature. In addition, polymers formed in the reaction or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually the olefin constitutes between about 0.1 and about 25 percent by volume of the mixture and preferably between about 2 and about 15 percent by volume.

The solvent or diluent employed in the polymerization reaction includes in general, paraffin hydrocarbons. Among the more useful solvents are acyclic paraffins having between about 3 and about 12 carbon atoms per molecule, such as, for example, propane, isobutane, n-pentane, isopentane, isooctane, etc., and preferably those acyclic paraffins having 5 to 12 carbon atoms per molecule. Also useful in the polymerization reaction are alicyclic hydrocarbons, such as cyclohexane, methylcyclohexane, etc. Aromatic diluents are not normally used because they (or impurities therein) tend to shorten the catalyst life; however, if catalyst life is not an important factor in the process, solvents of an aromatic nature can also be employed. All of the foregoing and in addition, other hydrocarbon diluents which are relatively inert, non-deleterious, and in the liquid state at the reaction conditions can also be employed in carrying out the reaction of olefins to form solid polymers.

In carrying out the invention, in one embodiment thereof, effluent from a polymerization reaction comprising a solution of solid olefin polymer in a hydrocarbon solvent, such as solid ethylene polymer in cyclohexane, which has been treated for the removal of catalyst and unreacted olefin is introduced to a flash vaporization zone wherein there is maintained a liquid phase superimposed by a gaseous phase. The polymer solution is introduced to the gaseous phase, preferably through a nozzle or other means for producing a spray, whereby the solution is finely divided and distributed throughout the vapor phase. Simultaneous with the introduction of polymer solution an inert gas is introduced to the flash vaporization zone in the lower portion thereof beneath the liquid level, said gas passing upwardly through the liquid and into the vapor phase. The pressure on the flash vaporization zone is maintained by controlling the flow of inert gas and solvent leaving the vapor phase. As a result of vaporization of the solvent in the flash vaporization zone, which is augmented by the partial pressure effect of the inert gas, the temperature within this zone is substantially reduced and precipitation of polymer from solution occurs. The precipitated polymer and unvaporized solution pass into and form the liquid phase which is withdrawn from the flash vaporization zone continuously as a slurry to maintain a substantially constant level therein.

The inert gas used in the process of this invention performs two important functions; first, as stated, due to its partial pressure effect, it aids in the vaporization of cyclohexane solvent, thus enabling the flash vaporization to be carried out at a higher pressure than would be otherwise possible. Secondly, the inert gas passing through the liquid phase becomes saturated with solvent and upon entering the gas phase retards flashing therein. The net effect of these two factors, namely increased pressure in the flash vaporization zone and retarded flashing in the vapor portion thereof operate to substantially increase the time required for the feed to reach equilibrium, thus allowing a substantial portion of the polymer precipitation from the feed to take place in the liquid phase. As a result, the polymer is precipitated as a finely subdivided homogeneous product rather than as a stringy fibrous material. Various inert gases can be employed in the process, including nitrogen, flue gases, light hydrocarbons, such as methane, ethane, ethylene, etc.

The operating conditions employed in the foregoing process can vary over a rather wide range depending on the particular polymer and solvent present in the polymer solution being treated. For example, when precipitating a solid polymer of ethylene from cyclohexane the reaction zone effluent usually is at a temperature of between about 250° and 400° F. and a pressure between about 150 and 500 p.s.i.g. With such a solution it has been found that the major portion of the polymer present therein can be precipitated by flashing to a temperature of between about 160° and 200° F. Normally this temperature would require a pressure of atmospheric or slightly below. However, in the method of this invention sufficient inert gas is provided to increase the pressure of the flash vaporization zone to between about 5 and 30 p.s.i.g. The amount of gas required for this purpose varies between about 0.3 and 2 mols per mol of cyclohexane solvent evaporated. In general, it is desirable that the concentration of the polymer entering the flash zone in the solution be maintained at a low level, usually between about one and about 15 percent by weight and preferably between about 3 and about 6 percent by weight. As stated, the major portion of the polymer, usually between about 55 and 95 weight percent, is precipitated in the flash vaporization zone. Most of the polymer remaining in solution is also recoverable as product; however, further cooling of the polymer solution is necessary to effect the removal of this material. Various methods can be employed for this purpose including cooling by indirect heat exchange or by adding cold solvent or by further reducing the pressure on the polymer slurry. While any of the foregoing methods can be employed their effectiveness in providing a homogeneous polymer product varies, with the more desirable product generally being provided where control over the rate of cooling is maintained. In one method, close control of the vaporization is provided by introducing the effluent slurry from the flash vaporization zone to a second vaporization zone wherein additional cooling is provided in the presence of an inert gas at a pressure slightly above atmospheric. By this method of operation a further precipitation of polymer results, providing in the case of ethylene polymer in cyclohexane solution, a total precipitation of about 98 weight percent of the polymer in the polymerization effluent. A portion of the polymer which remains in solution after this operation can be recovered if desired by one of the aforementioned methods, such as by indirect heat exchange or by the addition of cold solvent to the polymer slurry.

While the foregoing discussion has been directed particularly to the recovery of solid ethylene polymer from cyclohexane it is not intended that this embodiment in any way limit the scope of the invention, and the recovery of other solid olefins from various solvents as hereinbefore mentioned is also contemplated within the scope of the invention.

As previously mentioned, conventional flash vaporization when used for the recovery of solid olefin polymers from solution has in many instances provided a polymer having undesirable physical properties, said polymer being difficult to recover from solution by filtration, centrifugation, etc. In the method of this invention the polymer is precipitated as a substantially homogeneous product, in that it contains particles having substantially uniform characteristics and within a range of size so as to make them easily separable from the liquid by conventional separation means. In addition, the homogeneity of the product obtained by this invention has made possible close quality control of the finished products.

In order to more clearly describe the invention and provide a better understanding thereof, reference is had to the accompanying drawing which is a diagrammatic illustration of a polymerization unit and associated equipment for recovering polymer from solution, including polymerization reaction and catalyst separation system, a batch cooler for the removal of polymer from solution by controlled cooling and precipitation and auxiliary cooling means for further reducing the temperature of the polymer solution and precipitating additional polymer. Referring to the figure, ethylene, chromium oxide catalyst and cyclohexane diluent are introduced to reactor 8 through conduits 2, 6 and 4 respectively. For ease of handling, the catalyst is slurried in cyclohexane before it is introduced to the reactor. During polymerization the material in the reactor is maintained in a highly agitated state by means of a mechanical mixer or other conventional mixing means (not shown). The reaction is carried out at a temperature at about 285° F. and a pressure of about 500 p.s.i.a., and for a sufficient period of time to convert a portion of the ethylene feed to solid ethylene polymer. The reaction effluent leaves the reactor through conduit 10 and enters a separation zone 12 wherein a stream comprising principally unconverted ethylene and some solvent is separated and returned to the reactor through conduit 14 and cooler 16. Following this step the effluent is combined with additional solvent introduced through conduit 20. The mixture then passes by means of conduit 18 through an exchanger 22 wherein the temperature is increased, after which it is introduced to catalyst recovery zone 24. This zone may be a filter, a centrifuge, or the like designed to operate at superatmospheric pressure. Separated catalyst, which is removed through conduit 25, can be recycled to the reactor or discarded. As necessary, all or part of the recycled catalyst can be subjected to a regeneration treatment with oxygen for the removal of heavy polymers deposited thereon during polymerization. The remaining reaction effluent, now comprising a solution of ethylene polymer in cyclohexane, is introduced through conduit 26 to flash concentrator 28. In this vessel cyclohexane is vaporized, removed through conduit 30 and recycled to the cyclohexane feed to the reactor (not shown). In this manner the concentration of diluent in the reaction effluent is reduced to a suitable level for the batch cooling operation. Removal of cyclohexane in the flash concentrator is effected by reducing the pressure, or by increasing the temperature, or both.

The effluent from flash concentrator 28 passes through conduit 32 and is introduced to the vapor phase 40 of flash precipitator 36 through spray nozzle 34. Within this vessel the pressure of the polymer solution is substantially reduced whereby cyclohexane is vaporized, the temperature is reduced and polymer precipitates from solution. To aid in the temperature reduction and at the same time reduce the speed of vaporization an inert gas, in this instance nitrogen, is saturated with solvent vapor by being passed through the liquid phase 38 of the flash precipitator. The inert gas in introduced through nozzles 60 and passes upwardly through the liquid into the vapor space where it combines with vaporized cyclohexane, the combined vapors leaving the flash precipitator through conduits 42. A back pressure, in this example about 16 p.s.i.g., is maintained on the system by means of control valve 44, which is actuated by pressure recorder controller 46 connected to the vapor phase 40 of the flash precipitator. The combined gases from the precipitator are passed through compressor 48 where they are increased in pressure, then through conduit 50 and condenser 52 into accumulator 54. Nitrogen is withdrawn from the accumulator through conduit 58 and returned to the flash precipitator, and condensed cyclohexane is withdrawn through pump 62 and conduit 64 for recycle to various parts of the polymerization process as desired. Due to leakage from the system it is necessary to add make-up nitrogen from time to time, and this material is introduced to the accumulator through conduit 56. The liquid phase in the flash precipitator comprises a slurry of solid precipitated polymer in liquid cyclohexane. The polymer is maintained as a dispersion in the solvent by the action of the inert gas passing upwardly through the liquid. Sufficient slurry is withdrawn from the flash precipitator through pump 66, cooler 68 and conduit 70 to maintain a substantially constant level in said vessel. This material is subjected to further processing (not shown) for the separation of precipitated polymer and cyclohexane.

It is noted that in this specific example cooling of the polymer slurry and precipitation of additional polymer from solution are provided by passing the polymer slurry through indirect heat exchanger 68. It is also within the scope of the invention to provide the additional cooling by adding cold solvent to the slurry or by further reducing the pressure on the slurry either in the presence or absence of an inert gas.

The following data is presented in illustration of a preferred embodiment of the invention.

The polymer solution treated in the runs presented in the following table was obtained by reacting ethylene in the presence of cyclohexane and a catalyst comprising 2.5 percent by weight of chromium as chromium oxide, containing 2.2 percent by weight hexavalent chromium, with silica-alumina prepared by impregnating particulate silica-alumina with a solution of chromium oxide, followed by drying and activation in air at gradually increasing temperatures up to 950° F.

The operating conditions under which the polymer was formed were as follows:

Ethylene feed rate _____ lb./hr.___ 28
Cyclohexane feed rate _____ lb./hr.___ 30
Polymer concentration in reactor _____ wt. percent__ 8.8
Catalyst concentration in reactor _____ do____ 0.2
Pressure _____ p.s.i.g.___ 420
Temperature _____ ° F__ 286

In each run the polymer was precipitated as a finely subdivided homogeneous product.

*Example*

| Run No. | Temperature—° F. | | | Pressure—p.s.i.g. | | Polymer Solution Feed Rate, g.p.m. | Nitrogen Feed Rate, s.c.f.m. | Length of Run, Minutes | Dissolved polymer Concentration, Weight Percent | |
|---|---|---|---|---|---|---|---|---|---|---|
| | Precipitation Vessel | Polymer Solution Feed | Gas From Precipitation Vessel | Precipitation Vessel | Polymer Solution Feed | | | | In Feed | In Product |
| 1 | 167 | 195 | 167 | 16 | 30 | 0.20 | 0.52 | 16 | 3.00 | (¹) |
| 2 | 176 | 220 | 177 | 16 | 60 | 0.39 | 0.89 | 14 | 3.00 | (¹) |
| 3 | 160 | 200 | 155 | 17 | 85 | 0.25 | 0.53 | 13 | 3.00 | (¹) |
| 4 | 170 | 220 | 170 | 18 | 70 | 0.30 | 1.10 | 40 | 3.00 | (¹) |
| 5 | 164 | 235 | 178 | 18 | 60 | 1.10 | 6.00 | 20 | 2.76 | 0.62 |
| 6 | 167 | 253 | 185 | 17 | 70 | 1.10 | 6.00 | 42 | 2.76 | 1.58 |

¹ No quantitative results. Observed finely divided precipitated polymer in the precipitation vessel liquid phase.

Having thus described the invention by providing specific examples thereof, it is to be understood that no undue restrictions or limitations are to be drawn by reason thereof and that many modifications and variations are within the scope of the invention.

What is claimed is:

1. A continuous process for the removal of a solid polymer of a 1-olefin containing 2 to 8 carbon atoms from a solution thereof in a hydrocarbon solvent which comprises introducing said solution into the vapor phase of a flash vaporization zone containing a vapor phase and a liquid phase while simultaneously introducing gas inert to said polymer to said liquid phase to maintain the pressure in said zone at a substantially constant value slightly above atmospheric pressure and below the pressure of the incoming polymer solution whereby solvent is vaporized and a major portion of polymer is precipitated, and removing precipitated polymer and polymer solution from said liquid phase.

2. A continuous process for the removal of a solid polymer of a 1-olefin containing 2 to 8 carbon atoms from a solution thereof in a hydrocarbon solvent which comprises introducing said solution into the vapor phase of a flash vaporization zone containing a vapor phase and a liquid phase while simultaneously introducing gas inert to said polymer to said liquid phase to maintain the pressure in said zone at a substantially constant value slightly above atmospheric pressure and below the pressure of the incoming polymer solution whereby solvent is vaporized and a major portion of polymer is precipitated, removing precipitated polymer and polymer solution from said liquid phase, and further cooling said polymer solution to precipitate additional polymer.

3. The process of claim 2 in which the additional cooling is provided by introducing cold solvent to the polymer solution.

4. The process of claim 2 in which the additional cooling is provided by indirect heat exchange.

5. The process of claim 2 in which the additional cooling is provided by further reducing the pressure on the polymer solution.

6. The process of claim 5 in which the further reduction in pressure on the polymer solution is carried out in the presence of an inert gas.

7. A continuous process for the removal of solid polyethylene having a specific gravity of at least 0.94 from a solution thereof in cyclohexane, said polymer solution having a temperature of between about 250° F. and about 400° F. and a pressure of between about 150 p.s.i.g. and about 500 p.s.i.g. which comprises introducing said solution into the vapor phase of a flash vaporization zone containing a vapor phase and a liquid phase while simultaneously introducing gas inert to said polymer into said liquid phase to maintain the pressure in said zone at a substantially constant value between about 5 and about 30 p.s.i.g. whereby solvent is vaporized from said polymer solution resulting in the reduction in temperature of said solution to between about 160° F. and about 200° F. with the resultant precipitation of a major portion of polymer therefrom, removing precipitated polymer and polymer solution from the liquid phase and further cooling the polymer solution to a temperature of between about 100° F. and about 150° F. to precipitate additional polymer.

8. The process of claim 7 wherein said polymer solution is introduced into the vapor phase of said flash vaporization zone in the form of finely divided droplets.

9. A continuous process for the removal of solid polymer of ethylene having a specific gravity of at least 0.94 from cyclohexane, said solution having a temperature in the range of between about 250° F. and about 400° F. and a pressure between about 150 p.s.i.g. and about 500 p.s.i.g. which comprises introducing said solution into the vapor phase of a flash vaporization zone in the form of finely divided droplets, said flash vaporization zone containing a vapor phase and a liquid phase, introducing gas inert to said polymer into said liquid phase simultaneously with said solution to maintain the pressure in said zone at a substantially constant value between about 5 and about 30 p.s.i.g. whereby solvent is vaporized from said polymer solution resulting in the reduction and temperature of said solution to between about 160° F. and about 200° F. with the resultant precipitation of a major portion of the polymer therefrom, removing said precipitated polymer and polymer solution from said liquid phase to a second vaporization zone maintained at substantially atmospheric pressure whereby an additional reduction in temperature of the polymer solution takes place, removing precipitated polymer and polymer solution from said second flash vaporization zone and further cooling said polymer solution to a temperature between about 100° F. and 150° F. to precipitate additional polymer.

10. The process of claim 9 in which additional cooling is provided by introducing cold solvent to the polymer solution.

11. The process of claim 9 in which the additional cooling is provided by indirect heat exchange.

12. The process of claim 9 in which the additional cooling is provided by further reducing the pressure on the polymer solution.

13. The process of claim 12 in which the further reduction in pressure on the polymer solution is carried out in the presence of an inert gas.

References Cited in the file of this patent

UNITED STATES PATENTS

| | | |
|---|---|---|
| 2,187,877 | Ferris et al. | Jan. 23, 1940 |
| 2,565,960 | Garber et al. | Aug. 28, 1951 |
| 2,691,647 | Field et al. | Oct. 21, 1954 |
| 2,858,902 | Cottle | Nov. 4, 1958 |
| 2,914,518 | Cottle | Nov. 24, 1959 |